United States Patent [19]

Turchan, deceased et al.

[11] Patent Number: 4,482,613
[45] Date of Patent: Nov. 13, 1984

[54] CELL WITH SAFE VENTING ELECTROLYTE

[75] Inventors: Michael J. Turchan, deceased, late of Sudbury, Mass., by Susan B. Turchan, administratrix; Peter R. Moses, Windham, N.H.; Alwyn H. Taylor, Wellesley Hills, Mass.

[73] Assignee: Duracell Inc., Bethel, Conn.

[21] Appl. No.: 466,817

[22] Filed: Feb. 16, 1983

[51] Int. Cl.$^3$ .................... H01M 2/12; H01M 6/14
[52] U.S. Cl. .................... 429/53; 429/194; 429/197; 429/56; 29/623.1
[58] Field of Search .................... 429/53-57, 429/194, 197; 29/623.1

[56] References Cited

U.S. PATENT DOCUMENTS

| | | | |
|---|---|---|---|
| 3,542,602 | 11/1970 | Gabano | 429/199 X |
| 3,846,177 | 11/1974 | Mauch et al. | 429/53 |
| 4,321,314 | 3/1982 | Bowden et al. | 429/197 X |
| 4,430,392 | 2/1984 | Kelley et al. | 429/53 |

*Primary Examiner*—Donald L. Walton
*Assistant Examiner*—Stephen J. Kalafut
*Attorney, Agent, or Firm*—Ronald S. Cornell; Israel Nissenbaum

[57] ABSTRACT

The safety of a non-pressurized electrochemical cell such as a Li/MnO$_2$ cell, having a safety pressure vent and an organic electrolyte solvent is enhanced by, in conjunction with said vent, providing said organic electrolyte solvent with at least 80% by volume of a volatile component, such as dimethoxyethane, having a boiling point between 30° C. to 130° C. Upon cell venting, under abuse conditions, the cell is thereby rapidly evacuated and safely rendered inoperable under further abuse conditions.

20 Claims, No Drawings

CELL WITH SAFE VENTING ELECTROLYTE

This invention relates to non-aqueous electrolytes and their effect on cell safety and more particularly to such electrolytes for general consumer cells such as lithium-manganese dioxide cells.

With the advent of increasingly more powerful and higher capacity cells such as non-aqueous lithium cells, emphasis has also been placed on various safety means for rendering such cells suitable for general consumer applications and use. The most common safety device utilized in such cells has been the safety vent whereby under conditions of abuse which generally result in excessive internal cell pressure such pressure is relieved via the vent with further untoward hazardous conditions being thereby obviated. Such venting is particularly advantageous in pressurized cell systems (internal pressure above one atmosphere) such as lithium-sulfur dioxide wherein the cell electrolyte is rapidly evacuated and the cell deactivated by the opening of the vent. However, in non-pressurized cell systems such as lithium-manganese dioxide a vent is not as efficacious in evacuating the electrolyte commonly utilized in such cell system. As a result the cell generally continues to operate under the abuse condition, such as short circuit, with cumulative detrimental effect generally manifested by high temperature rise and the possibility of a fire.

It is an object of the present invention to provide a method for improving the safety of non-pressurized electrochemical cells.

It is a further object of the present invention to provide a non-pressurized electrochemical cell with a safe venting organic electrolyte which results in a substantial cessation of cell operation within a short period of time after cell venting.

These and other objects, features and advantages of the present invention will become more apparent from the following discussion.

Generally, the present invention comprises a method for improving the safety of substantially non-pressurized electrochemical cells and such cells. Said method comprises the steps of providing said cell with a safety vent and an organic electrolyte solvent comprised of at least 80% by volume and preferably at least 90% thereof of a high vapor pressure or volatile organic solvent having a boiling point above 30° C. (about ambient room temperature) but no higher than about 130° C. Preferably, the boiling point is below about 90° C. particularly in sodium containing cells (M.P. of Na about 98° C.). Such highly preferential utilization of a volatile electrolyte solvent is contrary to normally accepted safety theories wherein it has generally been considered to be de rigeur to minimize volatile solvent content in order to maintain cell safety. Alternatively it has been the object in the past to minimize the volatility of such solvents by complexing such volatile solvents, e.g. U.S. Pat. No. 4,321,314, wherein the volatile dimethoxyethane (DME) or other ether is complexed with the electrolyte salt. It has however been unexpectedly discovered that, in conjunction with a safety vent, substantially increasing the amount of the volatile electrolyte solvent component relative to other non-volatile electrolyte solvent materials results in the marked enhancement of the safety of the cell. Such safety enhancement may be attributed to the fact that upon cell venting at an elevated temperature and pressure the volatile electrolyte solvent is sufficiently vaporized to be rapidly evacuated from the cell during venting. Since, in accordance with the present invention such volatile solvent is the substantial (at least 80%) component of the cell electrolyte insufficient amounts of electrolyte remain in the cell to continue operation under the abusive condition. Cell operation is therefore safely substantially shut down within a short period of time after venting.

As an example of the operation of the present invention, lithium-manganese dioxide cells have generally contained, in commercial embodiments, an electrolyte solvent consisting of a 1:1 volumetric mixture of propylene carbonate (PC) and DME with a $LiClO_4$ electrolyte salts dissolved therein. The PC solvent component substantially provides the requisite conductivity of the electrolyte and the DME solvent component is added to improve low temperature performance since the PC becomes viscous at the lower temperatures. Under abuse conditions, such as short circuiting with resultant elevated temperatures and pressures, the cells vent at predetermined temperatures above about 70° C. and generally less than about 130° C. to prevent irreversible heat initiated chemical interactions. After venting, nearly all of the DME (B.P. about 83° C.) is removed by such venting, however, sufficient conductive PC (B.P. about 240° C.) remains in the cell to continue cell operation under the abusive condition with further detrimental temperature rise and the real possibility of a fire. The danger of a fire is substantially reduced by the replacement of the oxidizing $LiClO_4$ electrolyte salt with the less reactive $LiCF_3SO_3$ (LiTFS) electrolyte salt described in U.S. Pat. No. 4,279,972. However, while minimized, the danger of fire still exists. In accordance with the present invention wherein the percentage of the volatile DME is raised to 80 volume percent and more preferably 90 volume percent such danger is substantially eliminated. Additionally, though the increase in volume percentage of the DME in the electrolyte results in a lowered conductivity for the electrolyte, performance of the cell is surprisingly not detrimentally affected to any great extent even when the DME comprises 95% of the volume of the electrolyte. If feasible, the electrolyte solvent should substantially consist entirely of the volatile electrolyte solvent for maximum safety however elimination of the non-volatile component entirely generally does detrimentally affect cell performance. For example, total elimination of PC from a lithium-manganese dioxide cell in favor of an electrolyte of only DME results in a cell having severely reduced performance characteristics.

Cells made in accordance with the present invention must contain vents and are thus generally larger than those normally referred to as button cells which are generally unvented. Increasing the volumetric percentage of volatile electrolyte solvent in an unvented cell is in fact undesirable since a pressure under abusive conditions exacerbated by large amounts of vapor, without escape means for such vapor such as a vent, could cause a violent rupture of the cell container or seal.

Vents utilizable in the cells of the present invention include membranes which rupture upon stretching caused by excessive pressure or which are ruptured by being forced against a puncturing member under conditions of excessive pressure. Other vents include weakened portions of cell container walls, resilient or movable sealing members which are displaced under pressure, plugs which are expelled, and sealing materials which either melt at the high temperatures which accompany elevated pressures or which extrude at such elevated pressures. Generally the vents should be suitably positioned within the cell and inherently be capable of allowing rapid egress of the vaporized volatile electrolyte in order to provide the safe cells of the present invention. An expulsion factor of above about 70% of the electrolyte volume is desirable for more effective and rapid cell shutdown. However, factors of cell configuration, absolute volume of electrolyte and volatile solvent rate carrying capability and percentage will cause variation in the amount required to be vented. With a known relationship between temperature and pressure rise the pressure actuated vents may be adapted for operation at the desired temperatures of less than about 130° C.

In addition to DME, other volatile organic electrolyte solvents include dimethoxymethane (B.P. 41° C.) diethylether (B.P. 35° C.) and generally acyclic ethers which provide sufficient conductivity for efficient cell operation and which are chemically compatible with cell components. Though the volatile organic electrolyte solvents of the present invention have high vapor pressures they should however not have a vapor pressure, at room temperature, in excess of atmospheric pressure whereby the cell is converted into a pressurized system.

Anodes suitable for use in the cells of the present invention include lithium, sodium, potassium, magnesium, calcium and other alkali or alkaline earth metals. Metals having lower melting points will concomitantly generally require lower boiling points for the volatile component to ensure enhanced safety. Suitable cathodes include solid active cathodes such as the aforementioned manganese dioxide as well as other metal oxides, halides, chalcogenides, vanadates and carbon compounds such as $C_xS$, $CF_x$ and the like.

Electrolyte salts in addition to the LiTFS and LiClO$_4$ described above include those commonly utilized in non-aqueous cells such as alkali and alkaline earth metal perchlorates, hexafluoroarsenates, tetrafluoroborates, hexafluorophosphates, halides, tetrahaloaluminates, tetrahalogallates, etc. However, it is preferred that less reactive salts such as LiTFS be utilized in place of more reactive salts such as LiClO$_4$ whereby residual electrolyte remaining in the cell is not overly sensitive to cell temperature during or after venting.

In order to illustrate the efficacy of the present invention the following examples are presented. It is understood however that such examples are for illustrative purposes and that details contained therein are not to be construed as limitations on the present invention. Unless otherwise indicated all parts are parts by weight.

EXAMPLE 1

Six cells were constructed with each having a diameter of 0.95" (24 mm) and a height of 0.1" (2.5 mm) and each containing a one gram cathode of 90% MnO$_2$, 6% graphite and 4% polytetrafluoroethylene, and a 55 mg lithium foil anode 0.017" (0.42 mm) thick. The cells were filled with electrolytes having compositions as follows:

| Cell # | Electrolyte | Volume Ratio |
| --- | --- | --- |
| 1 (Prior Art) | 0.75 M LiClO$_4$ in PC/DME | (1:1) |
| 2 (Prior Art) | 1.0 M LiTFS in PC/DME | (1:1) |
| 3 | 1.0 M LiTFS in PC/DME | (2:8) |
| 4 | 1.0 M LiTFS in PC/DME | (1:9) |
| 5 | 1.0 M LiTFS in PC/DME | (0.5:9.5) |

-continued

| Cell # | Electrolyte | Volume Ratio |
| --- | --- | --- |
| 6 | 1.0 M LiTFS in DME | |

Each of the cells was discharged with a load of 500Ω. Cells 1–5 discharged similarly with each cell providing about 40–44 hours of service to 1.5 volts. Cell 6 provided a discharge generally below 2 volts and about 30 hours to 1.5 volts. Thus, aside from cell 6 in which the electrolyte solvent consisted entirely of the DME, it is evident that even substantial reduction of the amount of PC relative to the volatile DME does not substantially affect cell performance.

EXAMPLE 2

(Prior Art)

Two hundred cylindrical cells (0.645" (16.4 mm) diameter by 1.3" (32.8 mm) height) were made with each having 0.5 gm lithium foil anodes wound with 8 gm (85% MnO$_2$, 10% graphite, 5% PTFE) MnO$_2$ cathodes on expanded stainless stell substrates. The cells each contained a plastic rupture membrane vent adjacent to a membrane rupturing spike whereby at excessive cell pressure of about 130 psi and a temperature of between 90° C. to 130° C. the membrane was adapted to be forced against and punctured by the spike. Each cell was filled with an electrolyte comprised of 0.75M LiClO$_4$ in PC/DME (1:1). The cells were then made into one hundred series-connected batteries of two cells each and were deliberately short circuited. About 30% of the cells failed, with failure being defined as overheating and fire eruption after the cells had vented.

EXAMPLE 3

(Prior Art)

Twenty two-cell batteries were made similar to those in Example 2 but with each cell containing an electrolyte comprised of 1M LiTFS in PC/DME (1:1). The cells were deliberately short circuited and exhibited an improved failure rate of only 10%.

EXAMPLE 4

Batteries of two cells in series were made as in Example 2 but with a PC/DME volumetric ratio of 1:9 in each cell. The batteries, when short circuited, exhibited an improved failure rate of about 10%. The improvement in failure rate was thus comparable to that attained by substituting LiTFS for LiClO$_4$.

EXAMPLE 5

Two hundred two-cell batteries were made, similar to those in Examples 2 and 3, but with each cell containing an electrolyte comprised of 1M LiTFS in PC/DME (1:9). The cells were connected in series and deliberately short circuited. The cells vented without failure.

From the above examples it is evident that increasing the relative amount of volatile solvent such as DME in an electrolyte does not affect cell performance (except in the specific instance of total replacement of the PC by the DME) but when used in conjunction with a safety vent provides a substantially safer cell suitable for consumer applications and consumer type abuse. Furthermore, by additionally utilizing less reactive electrolyte salts such as LiTFS in place of more reactive salts such as LiClO$_4$ the cells may be rendered essentially safe.

It is understood that the above examples are for illustrative purposes and that changes may be made in cell composition, structure and relationship of components without departing from the scope of the present invention as defined in the following claims.

What is claimed is:

1. A method for improving the safety of a non-pressurized electrochemical cell containing an electrolyte salt and an organic electrolyte salt solvent comprising the steps of providing said cell with a pressure release vent; providing said solvent with a component, having a boiling point between 30° to 130° C., which is in a volatile state and which comprises at least 80% by volume of said solvent whereby cell abuse, resulting in temperature increase, causes said component to vaporize and to be substantially expelled from said cell through said vent thereby substantially shutting down cell operation; and under such abuse conditions substantially shutting down cell operation by vaporizing said component and substantially expelling it from the cell through said vent.

2. The method of claim 1 wherein said volatile component comprises at least 90% by volume of said organic electrolyte salt solvent.

3. The method of claim 1 wherein said volatile component is comprised of an acyclic ether.

4. The method of claim 1 wherein said volatile component is comprised of a member of the group consisting of dimethoxyethane, dimethoxymethane and diethyl ether.

5. The method of claim 4 wherein said volatile component is comprised of dimethoxyethane.

6. The method of claim 1 wherein the electrolyte salt, dissolved in said organic electrolyte salt solvent, comprises a salt substantially non-reactive at the temperature and pressure at which said vent is adapted to be actuated.

7. The method of claim 6 wherein said electrolyte salt is comprised of $LiCF_3SO_3$.

8. The method of claims 1, 3, 5, 6 or 7 wherein said cell contains an anode comprised of lithium.

9. An abuse resistant non-pressurized electrochemical cell comprised of an anode comprised of an alkali or alkaline earth metal, a solid active cathode, an electrolyte salt and an organic electrolyte salt solvent characterized in that said cell has a vent for release of pressure and at least 80% by volume of said organic electrolyte salt solvent being comprised of a component having a boiling point between 30° to 130° C. and which component is in the volatile state whereby cell abuse, resulting in temperature increase, causes said component to vaporize and to be substantially expelled from said cell through said vent thereby substantially shutting down cell operation.

10. The non-pressurized cell of claim 9 wherein said organic electrolyte salt solvent is comprised of at least 90% by volume of said volatile component.

11. The non-pressurized cell of claim 9 wherein said volatile component is comprised of dimethoxyethane.

12. The non-pressurized cell of claim 9 wherein the electrolyte salt dissolved in said organic electrolyte solvent comprises a salt substantially non-reactive at the temperature and pressure at which said vent is adapted to be actuated.

13. The non-pressurized cell of claim 12 wherein said electrolyte salt is comprised of $LiCF_3SO_3$.

14. The non-pressurized cell of claims 10, 11, or 13 wherein said anode is comprised of lithium.

15. The non-pressurized cell of claim 9 wherein said cathode is comprised of $MnO_2$.

16. A substantially safe abuse resistant non-pressurized electrochemical cell comprising a lithium anode, an $MnO_2$ cathode, a pressure releasing vent, an electrolyte salt substantially non-reactive at the temperature and pressure at which said vent is adapted to be actuated and an organic electrolyte solvent in which said electrolyte salt is dissolved with at least 80% by volume of said organic electrolyte being comprised of a component having a boiling point between 30° to 130° C. and which component is in the volatile state whereby cell abuse, resulting in temperature increase, causes said component to vaporize and to be substantially expelled from said cell through said vent thereby substantially shutting down cell operation.

17. The non-pressurized electrochemical cell of claim 16 wherein said volatile component is comprised of dimethoxyethane.

18. The non-pressurized cell of claim 17 wherein said dimethoxyethane comprises at least 90% of the volume of said solvent.

19. The non-pressurized cell of claim 16 wherein the remainder of said organic electrolyte solvent is comprised of propylene carbonate.

20. The non-pressurized cell of claims 16, 17 or 18 wherein said electrolyte salt is comprised of $LiCF_3SO_3$.

* * * * *